(12) United States Patent
Onohara

(10) Patent No.: US 7,845,672 B2
(45) Date of Patent: Dec. 7, 2010

(54) AIRBAG COVER AND AIRBAG APPARATUS

(75) Inventor: Keisuke Onohara, Tokyo (JP)

(73) Assignee: Takata Corporation, Tokyo (JP)

( * ) Notice: Subject to any disclaimer, the term of this patent is extended or adjusted under 35 U.S.C. 154(b) by 131 days.

(21) Appl. No.: 12/285,895

(22) Filed: Oct. 16, 2008

(65) Prior Publication Data

US 2009/0134609 A1 May 28, 2009

(30) Foreign Application Priority Data

Nov. 26, 2007 (JP) ............................. 2007-304296
Sep. 24, 2008 (JP) ............................. 2008-243696

(51) Int. Cl.
*B60R 21/16* (2006.01)
*B60R 21/20* (2006.01)
*B60R 21/205* (2006.01)

(52) U.S. Cl. ................. 280/728.3; 280/728.2; 280/731; 280/732

(58) Field of Classification Search ............. 280/728.3, 280/732, 731, 728.2
See application file for complete search history.

(56) References Cited

U.S. PATENT DOCUMENTS

| | | | | |
|---|---|---|---|---|
| 6,131,944 A * | 10/2000 | Henkel et al. | ............ | 280/728.3 |
| 6,186,534 B1 * | 2/2001 | Heinz | ....................... | 280/728.2 |
| 6,206,409 B1 * | 3/2001 | Kato et al. | ................ | 280/728.2 |
| 6,371,510 B1 * | 4/2002 | Marriott et al. | .......... | 280/730.1 |
| 7,125,043 B2 * | 10/2006 | Amamori | .................. | 280/743.1 |
| 7,213,837 B2 * | 5/2007 | Clarke et al. | ................. | 280/731 |
| 7,314,228 B2 * | 1/2008 | Ishiguro et al. | .......... | 280/728.2 |
| 7,370,880 B2 | 5/2008 | Hasebe | | |
| 7,445,238 B2 * | 11/2008 | Marriott | ...................... | 280/740 |
| 7,527,121 B2 * | 5/2009 | Kitte et al. | ................... | 180/274 |
| 2005/0212275 A1 * | 9/2005 | Hasebe | ..................... | 280/743.1 |
| 2007/0057498 A1 * | 3/2007 | Koh | ......................... | 280/743.1 |
| 2007/0164541 A1 | 7/2007 | Soderquist et al. | | |
| 2009/0079169 A1 * | 3/2009 | Yokota | .................... | 280/728.3 |
| 2009/0152842 A1 * | 6/2009 | Benny et al. | ............. | 280/728.3 |
| 2010/0066059 A1 * | 3/2010 | Klinkenberger et al. | .. | 280/728.1 |

FOREIGN PATENT DOCUMENTS

| | | |
|---|---|---|
| DE | 10 2004 023 780 A1 | 6/2006 |
| DE | 20 2006 009 205 U1 | 8/2006 |
| JP | H02-014944 | 1/1990 |
| JP | H06-156176 | 6/1994 |
| JP | H07-215154 | 8/1995 |
| JP | H08-156733 | 6/1996 |
| JP | H08-268198 | 10/1996 |
| JP | H11-321515 | 11/1999 |
| WO | WO 2006/003748 A1 | 1/2006 |

* cited by examiner

*Primary Examiner*—Lesley Morris
*Assistant Examiner*—James English
(74) *Attorney, Agent, or Firm*—Manabu Kanesaka

(57) ABSTRACT

An airbag cover for maintaining a folded shape of an airbag when the airbag is folded and accommodated within a casing, is designed to bulge from an opening formed on a panel constituting a vehicle inner wall for deploying between the panel and an occupant. The airbag cover includes a flat structure for covering at least a side of the airbag facing the opening before a deployment, and a tear line located on the flat structure and facing the opening so as to allow the airbag to bulge from the opening when deployed by cleaving the flat structure. The tear line is located on a side closer to the occupant relative to a center of the airbag cover in a direction of a vehicle length.

12 Claims, 4 Drawing Sheets

AIRBAG COVER AND AIRBAG APPARATUS

BACKGROUND OF THE INVENTION AND RELATED ART STATEMENT

The present invention relates to an airbag cover for preventing a deformation in folded-state of an airbag for restraining an occupant in case of a collision of a vehicle, such as an automobile, when the airbag is folded and accommodated within a casing, and the invention also relates to an airbag apparatus having the airbag cover.

Hitherto, it is known that, in the event of an emergency, such as an automobile collision or rolling, an inflator is operated so as to inflate the airbag for restraining an occupant by gas injected from the inflator.

This airbag apparatus includes an airbag that is a simple bag made by stitching a plurality of base clothes together at their edges. In a rest state, the airbag is folded and accommodated within the casing. At the emergency, such as the automobile collision or rolling, upon injecting gas by an operation of the inflator, the gas entirely flows inside the airbag so that the airbag is inflated and developed by its internal pressure.

Such an airbag apparatus may include an airbag cover for covering the airbag to be folded and accommodated within the casing (see Patent Document 1: Japanese Unexamined Patent Application Publication No. H11-321515). The airbag cover (flexible protective cover) of a conventional technique includes a pair of flat structures (material webs) each provided transversely to cover the bulging side of the folded and accommodated airbag, and during operating of the inflator, these flat structures allow the airbag to bulge by breaking tearing lines (tearing locations) provided substantially at the center of the flat structures in the longitudinal direction.

In the conventional technique mentioned above, the basic configuration of the airbag cover used when the airbag is folded and accommodated within the casing is disclosed. In such a configuration, in order to optimize the development of the airbag, it is required to optimize the position of the tearing lines in the airbag cover.

An object of the present invention is to provide an airbag cover and an airbag apparatus capable of improving development properties of the airbag.

Further objects and advantages of the invention will be apparent from the following description of the invention.

SUMMARY OF THE INVENTION

In order to achieve the object mentioned above, according to a first aspect of the invention, an airbag cover for maintaining the folded shape of an airbag when the airbag is folded and accommodated within a casing, is bulged from an opening formed on a panel constituting a vehicle inner wall for inflating and developing between the panel and an occupant, and the airbag cover includes a flat structure for covering at least a side of the airbag facing the opening during non-operating state of an inflator for supplying gas to the airbag; and tear lines located on a side of the occupant in the flat structure facing the opening so as to allow the airbag to be bulged from the opening during the operation of the inflator by cleaving the flat structure.

In general, in a passenger airbag apparatus provided on a passenger seat and a knee airbag apparatus for restraining an occupant's knee, an airbag is to be bulged from an opening formed on a panel constituting a vehicle inner wall to the occupant i.e., in a direction to a rear side of the vehicle. Hence, a lid member for blocking the panel opening in a rest state is configured such that the side of the occupant can be opened by rotating the lid member to its end adjacent to the vehicle front (a side opposite to the occupant), thereby enabling the airbag to smoothly bulge toward the occupant.

According to a first aspect of the present invention, during a non-operating state of the inflator, at least the side of the folded airbag facing the panel opening is covered with a flat structure of the airbag cover, and the airbag is accommodated within the casing. Then, upon the operation of the inflator, the flat structure is broken at tear lines, so that the airbag bulges from the panel opening for inflating and developing between the panel and the occupant.

At this time, the tear lines are formed to unevenly locate on the side of the occupant in the flat structure facing the panel opening. Thereby, the bulging direction of the airbag after breaking the flat structure can be guided toward the occupant. As a result, the airbag can smoothly bulge in conjunction with the operation of the lid member of which the end adjacent to the occupant is opened by rotating about the end adjacent to the vehicle front (opposite to the occupant), thereby improving the development abilities of the airbag.

In the second aspect of the invention, an airbag cover according to the first aspect of the invention further includes a first tongue structure provided inside the flat structure so as to emerge when the flat structure is broken at the tear lines and to intervene in between the end of the opening of the panel adjacent to the occupant and the airbag in the course of inflating and developing of the airbag.

Generally, in the airbag apparatus where the airbag bulges from the opening formed on the panel constituting the vehicle inner wall for inflating and developing between the panel and the occupant, a tear line is formed in between the lid member for shielding the panel opening and the end of the panel opening, so that during the developing of the airbag, the lid member is opened by the instant cleaving of the tear line. Hence, burrs and fins may be formed at the end of the panel opening, so that when the airbag is brought into contact with the opening end, the airbag development may be affected or the airbag may be damaged due to sticking. At this time, especially in the passenger airbag apparatus or the knee airbag apparatus, since the airbag bulges from the panel opening toward the occupant, the end of the panel opening adjacent to the occupant tends to contact with the airbag.

According to a second aspect of the invention of the present application, in connection with this tendency, the airbag cover further includes a first tongue structure provided inside the flat structure so as to emerge when the flat structure is broken at the tear lines and to intervene in between the end of the opening of the panel adjacent to the occupant and the airbag during inflating and developing of the airbag. Thereby, during the development of the airbag, the contact between the airbag and the end of the panel opening adjacent to the occupant can be avoided, so that developing properties of the airbag can be preferably maintained while the durability can be improved by suppressing the airbag damage.

In a third aspect of the invention of an airbag cover, the flat structure according to the second aspect includes a second tongue structure formed to emerge on the side opposite to the occupant after the breaking at the tear lines so as to intervene in between the end of the opening of the panel opposite to the occupant and the airbag during the deployment of the airbag.

Since the end of the panel opening opposite to the occupant, as mentioned above, is an axis about which the lid member is rotated, although burrs may not be formed unlike the end adjacent to the occupant mentioned above, the fins may be formed due to the bending of the panel at an acute angle.

According to the third aspect of the invention, in connection with this tendency, the second tongue structure emerged on the side opposite to the occupant after the breaking of the flat structure is configured to intervene in between the end of the opening of the panel opposite to the occupant and the airbag during the development of the airbag. Thereby, the contact between the airbag and the end of the panel opening opposite to the occupant can be avoided during the airbag developing, so that developing properties of the airbag can be further preferably maintained while the durability of the airbag can be further improved by further suppressing the airbag damage.

According to a fourth aspect of the invention, the first tongue structure in the third aspect includes a pair of side-cover parts covering both sides in the vehicle width direction, respectively, of the airbag folded and accommodated within the casing.

According to the fourth aspect of the invention, both sides of the airbag folded and accommodated within the casing in the vehicle width direction are covered with the side-cover parts of the first tongue structure, respectively. Thereby, the perimeter of the folded airbag can be covered with the airbag cover by covering the accommodated airbag in the vehicle front-back direction with the flat structure. As a result, the function maintaining the folded shape when the airbag is accommodated in the casing can be further improved, suppressing the generation of shape collapsing of the airbag during the accommodating.

According to a fifth aspect of the invention, the flat structure in the fourth aspect includes through-holes formed at both ends in the longitudinal direction, respectively, to be passed through by fixing members for fixing the casing to the vehicle, and the first tongue structure includes the through-hole formed at the base end to be inserted to the fixing member.

According to the fifth aspect of the invention, the through-holes formed at both ends of the flat structure in the longitudinal direction and the through-hole formed at the base end of the first tongue structure are passed through by fixing members, respectively, for fixing the casing to the vehicle. Thereby, the airbag cover composed of the flat structure and the first tongue structure can be fixed in the casing. By diverting the fixing member of the casing to fixing the airbag cover in such a manner, an additional fixing member is not required for fixing the airbag cover, thereby simplifying the structure.

According to a sixth aspect of the invention, the flat structure in the fifth aspect includes a connection part formed to emerge adjacently to the occupant after the breakage at the tear lines, said connection part being sewn and connected with the first tongue structure.

According to the sixth aspect of the invention, before the operation of the inflator (before the breakage of the flat structure), the flat structure and the first tongue structure are connected together with sewing. After the operation of the inflator, the connection part emerged and separated from the flat structure and the first tongue structure are connected together with sewing. Thereby, throughout the operation of the inflator, the first tongue structure can be stably fixed.

In order to achieve the object mentioned above, an airbag apparatus according to a seventh aspect of the invention includes an airbag arranged to bulge from an opening formed on a panel constituting a vehicle inner wall for inflating and developing between the panel and an occupant; the airbag cover according to any one of the first to sixth aspects of the invention for maintaining the folded shape of the airbag when the airbag is folded and accommodated within a casing arranged inside the panel; an inflator for supplying gas to the airbag; and the casing for accommodating the airbag, the airbag cover, and the inflator therein.

In general, in a passenger airbag apparatus provided on a passenger seat and a knee airbag apparatus for restraining an occupant knee, an airbag is to bulge from an opening formed on a panel constituting a vehicle inner wall toward an occupant i.e., in a direction of the rear side of the vehicle. Hence, a lid member for blocking the panel opening in the rest state is configured such that the side of the occupant can be opened by rotating the lid member about its end adjacent to the vehicle front (side opposite to the occupant), thereby enabling the airbag to smoothly bulge toward the occupant.

According to the seventh aspect of the invention, during non-operating state of an inflator, in a state that at least the side of a folded airbag to a panel opening is covered with a flat structure of an airbag cover, the airbag is accommodated within a casing. Then, upon operating of the inflator, the flat structure is broken at tear lines, so that the airbag is bulged from the panel opening for inflating and developing to between the panel and an occupant.

At this time, the tear lines are formed to be unevenly located on the side of the occupant in the flat structure facing the panel opening. Thereby, the bulging direction of the airbag with the broken flat structure can be guided toward the occupant. As a result, the airbag can smoothly bulges in conjunction with the operation of the lid member of which the end adjacent to the occupant is opened by rotating about the end adjacent to the vehicle front (opposite to the occupant), thereby improving the development properties of the airbag.

According to the present invention, the development properties of the airbag can be improved.

DETAILED DESCRIPTION OF THE PREFERRED EMBODIMENTS

Embodiments according to the present invention will be described below with reference to the drawings.

Figure 1A:
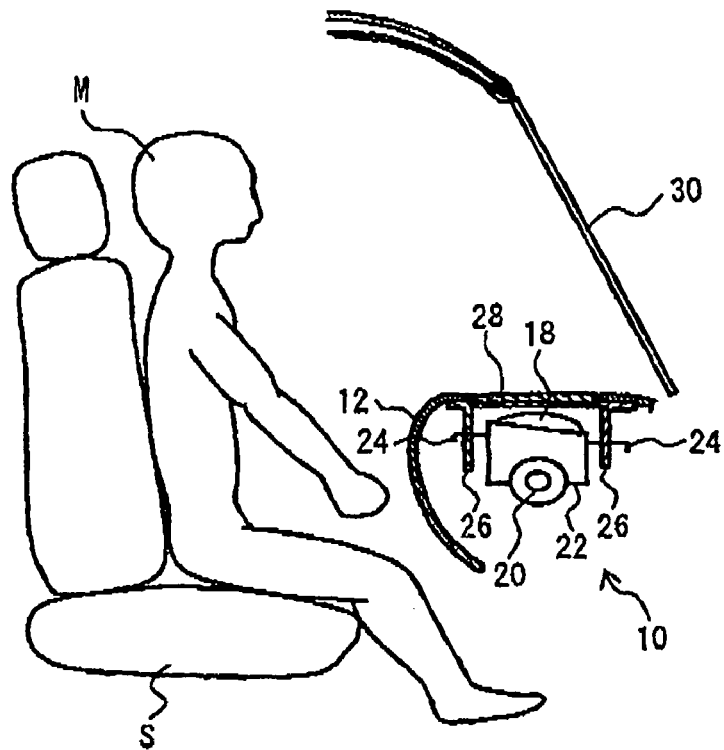
FIGS. 1(a), 1(b) are side sectional views of a passenger airbag apparatus according to an embodiment of the present invention, showing schematic structures in a rest state and during operation of an inflator.
Figure 1B:
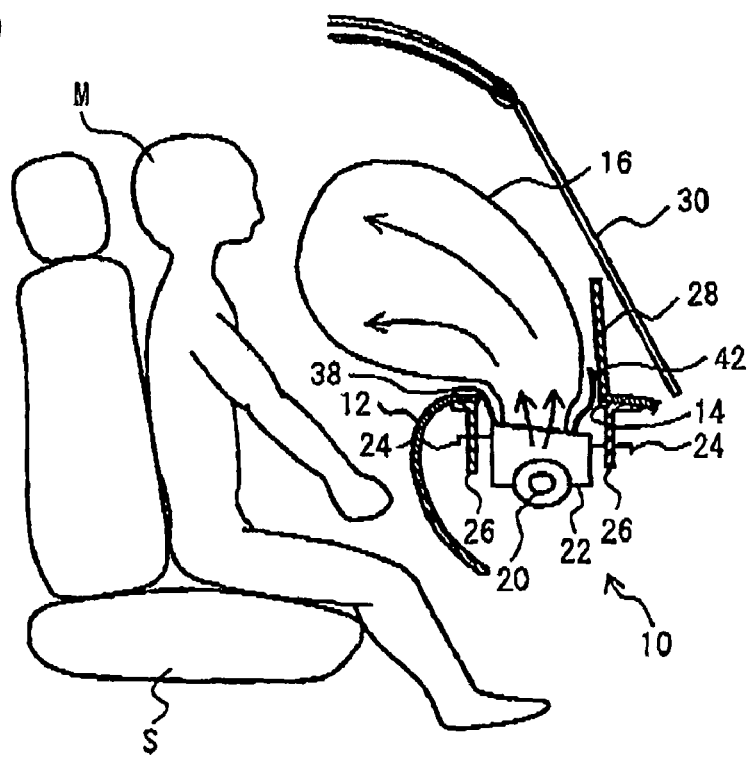

FIGS. 1(a), 1(b) are schematic side sectional views of the structure of an airbag apparatus according to the embodiment of the present invention incorporated in a passenger airbag, in which FIG. 1(a) shows a rest state of an inflator and FIG. 1(b) shows an inflating and developing state of the airbag during operating of the inflator.

In FIGS. 1(a) and 1(b), in front (in a vehicle traveling direction, on the right of FIGS. 1(a), 1(b)) of an occupant M sitting on a passenger seat S, an instrument panel 12 is arranged, and a passenger airbag apparatus 10 is provided within the instrument panel 12 (panel). The passenger airbag apparatus 10 includes an airbag 16 to bulge from an opening 14 (appropriately referred to a "panel opening" below) so as to inflate and develop between the instrument panel 12 and the occupant M; an airbag cover 18 for maintaining a folded shape of the airbag 16 when the airbag 16 is accommodated in a retainer, which will be described later; an inflator 20 for supplying gas to the airbag 16; and a retainer 22 (casing) for accommodating the folded airbag 16 arranged inside the instrument panel 12, the airbag cover 18 covering the airbag 16, and the inflator 20 therein.

On both sides of the retainer 22 in the vehicle front-back direction, a plurality of claw members 24 are provided. By the plurality of claw members 24 retained to support members 26 provided inside the instrument panel 12, the retainer 22 is fixed inside the instrument panel 12.

The opening 14 of the instrument panel 12, as shown in FIG. 1(a), is provided with a lid member 28 for blocking the opening in the rest state. The lid member 28 is configured such that the side of the occupant M can be opened by rotating the lid member 28 about its end adjacent to the vehicle front (side opposite to the occupant M) toward a front windshield 30. As shown in FIG. 1(b), during the inflator operation, a cleavable tear line (not shown) formed between the lid member 28 and the end of the panel opening 14 is cleaved and the lid member 28 is rotated so as to open the side of the occupant M, thereby enabling the airbag 16 to smoothly bulge toward the occupant M. The structure of the end of the lid member 28 adjacent to the vehicle front (side opposite to the occupant M) serving as the rotational axis of the lid member 28 may be a hinge structure or a structure using the deflection of the member.

In a passenger seat airbag apparatus 10 configured in such a manner, in the rest state, as shown in FIG. 1(a), the airbag 16 is folded and accommodated within the retainer 22.

Then, in case of an emergency, such as a vehicle collision, the inflator 20 is operated by receiving a control signal from a control device (not shown) so as to inject combustion compressed gas by igniting an igniting agent provided inside, thereby increasing the internal pressure so as to make the folded airbag 16 inflate and develop. Then, as shown in FIG. 1(b), the airbag 16 cleaves the tear line formed between the lid member 28 and the end of the panel opening 14 with its inflating force so as to open the lid member 28. Thereby, the airbag 16 bulges outside the retainer 22 and the instrument panel 12 so as to inflate and develop toward the occupant M sitting on the passenger seat S for restraining the upper body of the occupant M with the inflated airbag 16.

Though details will be described later, during the inflation and development of the airbag 16, as shown in FIG. 1(b), a second tongue structure 42 emerged by the braking of a flat structure 36 of the airbag cover 18 bulges to intervene between the side end of the front windshield 30 in the panel opening 14 and the airbag 16 while a first tongue structure 38 provided inside the flat structure 36 emerges when the flat structure 36 is broken so as to bulges to intervene between the end of the panel opening 14 adjacent to the occupant M and the airbag 16.

Figure 2:
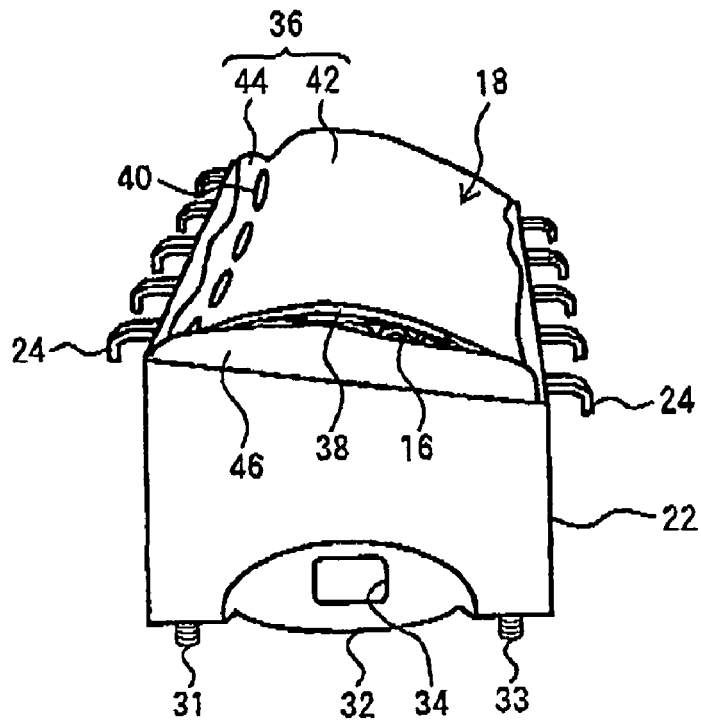
FIG. 2 is a perspective view of a retainer showing a whole structure.
Figure 3:
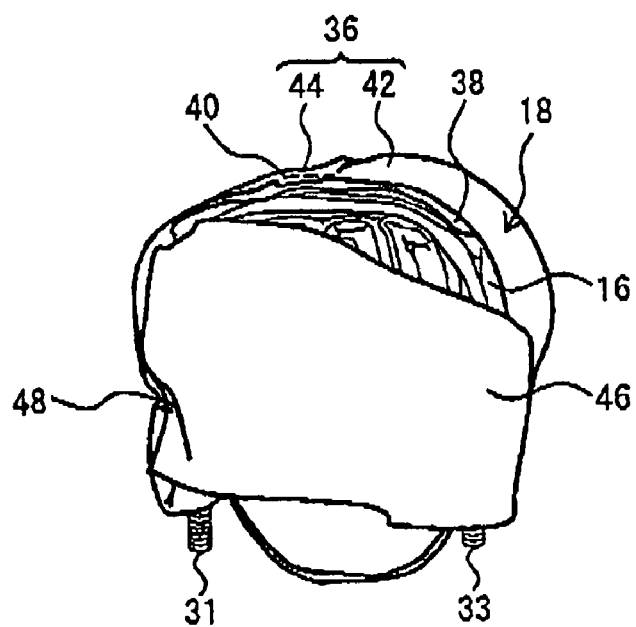
FIG. 3 is a side view of an airbag cover for covering an airbag showing a whole structure in a state of being accommodated within the retainer.

FIG. 2 is a perspective view of the retainer 22 showing its whole structure. FIG. 3 is a side view of the airbag cover 18 for covering the airbag 16 showing its whole structure in a state of being accommodated within the retainer 22.

In FIGS. 2 and 3, the retainer 22, as mentioned above, includes a plurality of the claw members 24 provided on both sides of the retainer 22 in the vehicle front-back direction (lateral direction in FIG. 2), and the retainer 22 is fixed on the vehicle with bolts 31 and 33 (fixing members) inserted into through-holes (not shown) formed on the bottom surface. The retainer 22 also includes an inflator support part 32 arranged adjacent to the bottom surface (downside of FIG. 2) and the retainer 22 supports the inflator 20 inserted into the airbag 16 with the inflator support part 32. An opening 34 shown in the drawing is for deriving a cable connecting between the inflator 20 and the control device (not shown) for controlling the initiation of the inflator 20.

Also, when the airbag 16 is accommodated within the retainer 22 for maintaining a folded shape of the airbag 16, it is accommodated by being covered by the airbag cover 18. At this time, the airbag cover 18 includes the substantially belt-shaped flat structure 36 covering the side of the panel opening 14 (upside of FIGS. 2 and 3) and both sides in the vehicle front-back direction (lateral direction in FIGS. 2 and 3) of the airbag 16; and the substantially tongue-shaped first tongue structure 38 arranged inside the flat structure 36 (adjacent to the accommodated airbag) and stitched to the flat structure 36.

The flat structure 36 is provided with slits 40 (breaking locations) formed to be unevenly located on the side of the occupant M (on the left of FIGS. 2 and 3) in the flat structure 36 facing the panel opening 14 (i.e., the upper portion of FIG. 2 exposed from the retainer 22 and the upper portion of FIG. 3) for allowing the airbag 16 to bulge from the panel opening 14 by cleaving the flat structure 36 during the operation of the inflator 20. Thereby, the flat structure 36 includes the substantially tongue-shaped second tongue structure 42 formed to emerge oppositely to the occupant M (on the right of FIGS. 2 and 3) after the breakage along the slits 40 of the flat structure 36 so as to intervene between the end of the panel opening 14 adjacent to the front windshield 30 and the airbag 16 during inflating and developing of the airbag 16; and a connection part 44 formed to emerge adjacently to the occupant M (on the left of FIG. 2) after the breakage along the slits 40 of the flat structure 36 and sewn and connected with the first tongue structure 38.

The first tongue structure 38 includes a pair of side-cover parts 46, 46 covering both sides, respectively, of the folded and accommodated airbag 16 in the vehicle width direction (perpendicular direction to the plane of FIG. 2). The side-cover part 46, as shown in FIG. 2, is formed to have such a size that when the airbag 16 is accommodated within the retainer 22, the side-cover part 46 slightly protrudes toward the panel opening 14 (upside of FIG. 2).

The reason why the flat structure 36 is provided with the slits 40 so as to cleave therealong during the development of the airbag is that the shape maintaining function of the airbag 16 when the airbag 16 is accommodated within the retainer 22 can be improved in comparison with the configuration in that the tongue structures 38, 42 are simply placed on the airbag 16. Furthermore, this configuration has an advantage for improving developing properties by increasing the internal pressure during initiation of the inflating of the airbag to a predetermined pressure.

Figure 4A:
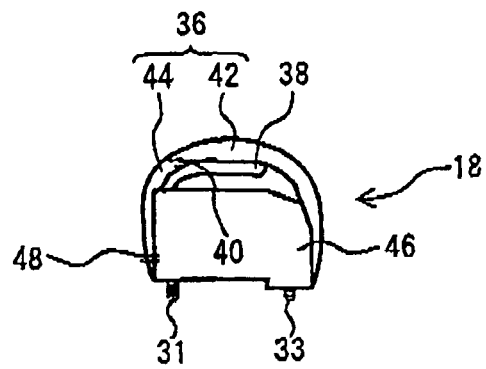
FIGS. 4(a), 4(b), 4(c) are side views and developed plan views of the airbag cover showing a whole structure.
Figure 4B:
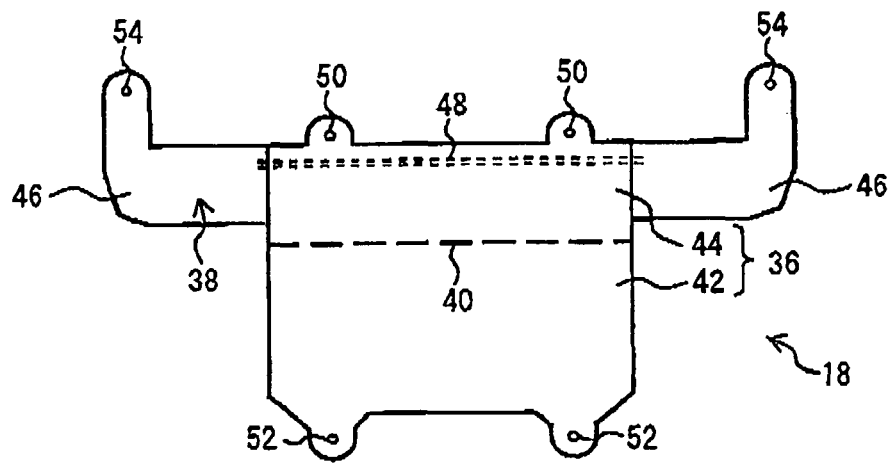
Figure 4C:
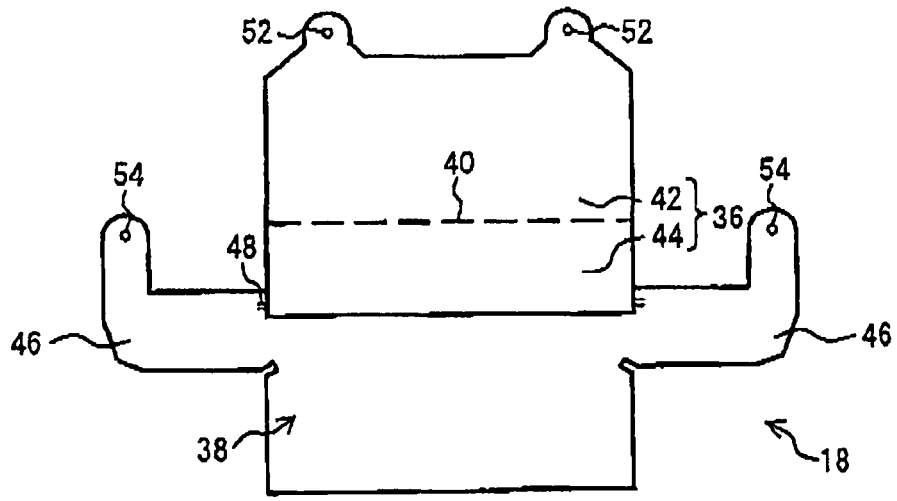
Figure 5A:
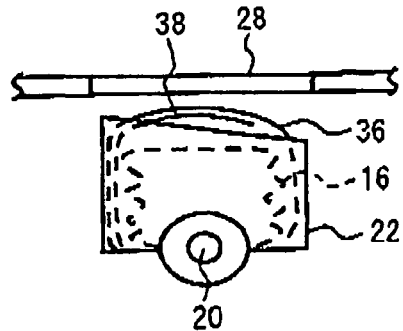
FIGS. 5(a), 5(b), 5(c), 5(d) are drawings of a passenger airbag apparatus conceptually showing the behavior during operation of the inflator.
Figure 5B:
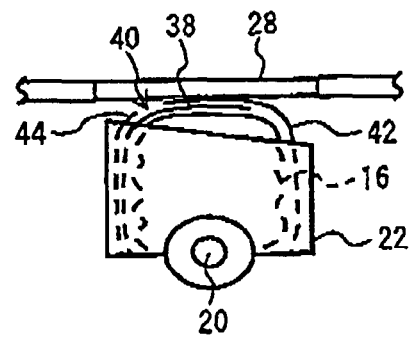
Figure 5C:
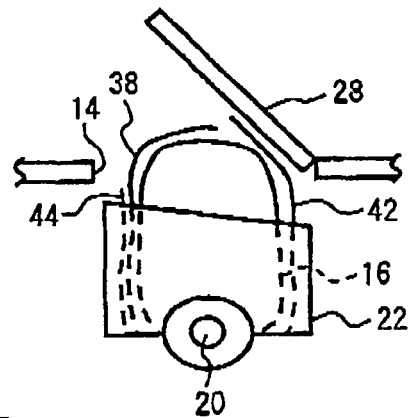
Figure 5D:
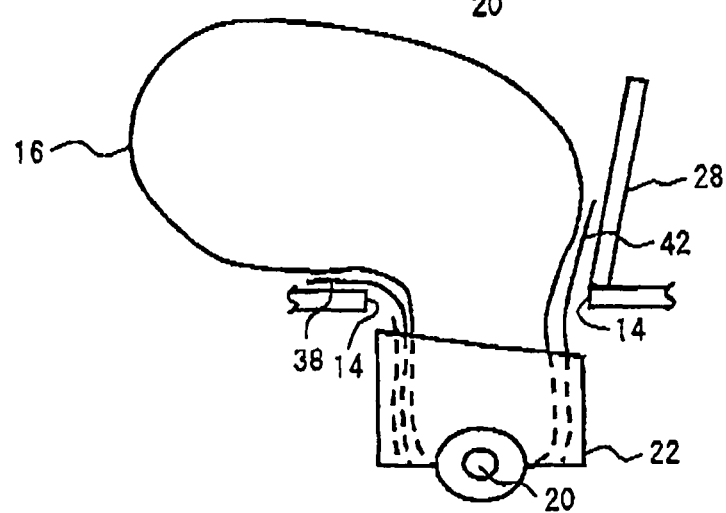

FIGS. 4(a), 4(b), 4(c) are explanation views of the airbag cover 18 showing the whole structure, in which FIG. 4(a) is a side view of the airbag 16 in a state of being covered, FIG. 4(b) is a developed plan view of the flat structure 36 in a state of being overlapped on the first tongue structure 38 (in this condition, the airbag cover 18 is wrapped over the airbag 16), FIG. 4(c) is a developed plan view of the flat structure 36 in a state of being upwardly turned over (upside in the drawing). FIG. 4(a) corresponds to a simplified view of FIG. 3. In FIG. 4(a), the airbag 16 is omitted.

In FIGS. 4(a) to 4(c), the airbag cover 18 includes the flat structure 36 and the first tongue structure 38 arranged inside the flat structure 36 (internally perpendicular direction to the plane of FIGS. 4(b) and 4(c)). The connection part 44 connects the flat structure 36 and the first tongue structure 38 by sewing therebetween. Reference numeral 48 in the drawing denotes a sewing line (see FIG. 3).

As mentioned above, the flat structure 36 is provided with the slits 40 formed to be unevenly located on the side of the occupant M in the flat structure 36 facing the panel opening 14. The flat structure 36 also includes the second tongue structure 42 formed to emerge oppositely to the occupant M (on the right of FIG. 4(*a*), the downside of FIGS. 4(*b*) and 4(*c*)) after the breakage along the slits 40 of the flat structure 36 so as to intervene between the end of the panel opening 14 adjacent to the front windshield 30 and the airbag 16 during inflating and developing of the airbag 16 and the connection part 44 formed to emerge adjacently to the occupant M (on the left of FIG. 4(*a*), the upside of FIGS. 4(*b*) and 4(*c*)) after the breakage along the slits 40 of the flat structure 36 and sewn and connected with the first tongue structure 38. As shown in FIGS. 4(*b*) and 4(*c*), the flat structure 36 also includes through-holes 50, 52, into which the bolts 31, 33 (see FIG. 2) for fixing the retainer 22 onto the vehicle can be inserted, on both sides in the longitudinal direction (the vertical direction of FIGS. 4(*b*) and 4(*c*)), respectively. By inserting the bolts 31, 33 into the through-holes 50, 52, respectively, the flat structure 36 is fixed to the retainer 22.

On the other hand, the first tongue structure 38, as mentioned above, includes a pair of the side-cover parts 46, 46 covering both sides, respectively, of the folded and accommodated airbag 16 in the vehicle width direction. The first tongue structure 38 also includes through-holes (not shown), into which the bolts 31 can be inserted, formed at positions of the base end portion (upper end portion of FIGS. 4(*b*) and 4(*c*)) corresponding to the through-holes 50, respectively. Furthermore, the side-cover part 46 also includes a through-hole 54, into which the bolt 33 can be inserted, formed adjacent to the base end (upside of FIGS. 4(*b*) and (*c*)). As a result, by inserting the bolts 31, 33 into the through-holes (not shown) in the base end portion of the first tongue structure 38 as well as the through-holes 50 of the flat structure 36 and the through-holes 54 of the side-cover parts 46 as well as the through-holes 52 of the flat structure 36, respectively, the first tongue structure 38 is fixed to the retainer 22.

The condition of the flat structure 36 being turned over upwardly shown in FIG. 4(*c*) as described above shows a structure of the airbag cover 18. In fact, the airbag cover 18 covers the airbag 16 in a state shown in FIG. 4(*b*) and is accommodated within the retainer 22.

FIGS. 5(*a*), (*b*), (*c*), (*d*) are conceptual drawings of the passenger airbag apparatus 10 showing its behaviors during the operation of the inflator. In FIGS. 5(*a*), (*b*), (*c*), (*d*), the claw members 24 and the support members 26 are omitted for preventing complication.

In the rest state in that the inflator is not operating, as shown in FIG. 5(*a*), the airbag 16 is folded up and covered with the flat structure 36 and the first tongue structure 38 provided inside the flat structure 36 so as to be accommodated within the retainer 22.

Upon operating the inflator 20, as shown in FIG. 5(*b*), the internal pressure is increased by injected gas so as to make the folded airbag 16 inflate and develop. At this time, the flat structure 36 cleaves at the slits 40 formed to be unevenly located on the side of the occupant M (on the left in FIGS. 5(*a*), (*b*), (*c*), (*d*) in the portion facing the panel opening 14 so as to allow the airbag 16 to bulge, while, due to the breakage of the flat structure 36, the second tongue structure 42 emerges in the vehicle front direction (on the right of FIGS. 5(*a*), 5(*b*), 5(*c*), 5(*d*)) and the connection part 44 emerges on the side of the occupant M.

Then, the lid member 28 is pushed up due to the inflation of the airbag 16, and the lid member 28, as shown in FIG. 5(*c*), is rotated about its end in the vehicle front direction so as to open the side of the occupant M. The first tongue structure 38 also emerges from the broken flat structure 36 so as to bulge together with the airbag 16 from the panel opening 14.

As shown in FIG. 5(*d*), the airbag 16 is further inflated and finally developed to between the instrument panel 12 and the occupant M. At this time, the first tongue structure 38 intervenes in between the end of the panel opening 14 adjacent to the occupant M and the airbag 16 while the second tongue structure 42 intervenes in between the end of the panel opening 14 in the vehicle front direction and the airbag 16.

From the passenger airbag apparatus 10 according to the embodiment configured as described above, the following advantages can be obtained.

Namely, according to the embodiment, the lid member 28 for shielding the panel opening 14 of the instrument panel 12 in the rest state is configured such that the lid member 28 can open up the side of the occupant M by rotating about the end thereof in the vehicle front direction (opposite to the occupant M), so that during the operation of the inflator 20, the airbag 16 can smoothly bulge toward the occupant M by opening the side of the occupant M.

In the passenger airbag apparatus 10 according to the embodiment, during non-operating state of the inflator 20, in a state where the side of the folded airbag 16 to the panel opening is covered with the flat structure 36 of the airbag cover 18, the airbag 16 is accommodated within the retainer 22. Then, upon operation of the inflator 20, the flat structure 36 is broken across the slits 40, so that the airbag 16 bulges from the panel opening 14 for inflating and developing between the instrument panel 12 and the occupant M.

At this time, the slits 40 are formed to be unevenly located on the side of the occupant M in the flat structure 36 facing the panel opening 14. Thereby, the bulging direction of the airbag 16 with the broken flat structure 36 can be guided toward the occupant M. As a result, the airbag 16 can smoothly bulge along with the operation of the lid member 28 of which the end adjacent to the occupant M is opened by rotating about the end in the vehicle front direction (opposite to the occupant M), improving the development properties of the airbag.

The following advantage can also be achieved especially according to the embodiment. That is, in the passenger airbag apparatus 10 according to the embodiment, a tear line is formed in between the lid member 28 for shielding the panel opening 14 and the end of the panel opening 14, so that during the airbag developing, the lid member 28 is opened by the instant cleaving of the tear line. Hence, burrs and fins may be formed at the end of the panel opening 14, so that when the airbag 16 is brought into contact with the end of the panel opening 14, the airbag development may be affected or the airbag 16 may be damaged due to sticking. Since, in particular, the airbag 16 bulges from the panel opening 14 toward the occupant M, the end of the panel opening 14 adjacent to the occupant M tends to contact with the airbag 16.

According to the embodiment, in view of this tendency, the airbag cover 18 further includes the first tongue structure 38 provided inside the flat structure 36 so as to emerge when the flat structure 36 is broken and to intervene in between the end of the panel opening 14 adjacent to the occupant and the airbag 16 during the airbag developing. Thereby, during the airbag developing, the contact between the airbag 16 and the end of the panel opening 14 adjacent to the occupant M can be avoided, so that developing properties of the airbag 16 can be preferably maintained while the durability the airbag 16 can be improved by suppressing the airbag damage.

The following advantage can also be achieved especially according to the embodiment. That is, since the end of the panel opening 14 opposite to the occupant M is an axis about which the lid member 28 is rotated, although burrs may not be formed unlike the end of the panel opening 14 adjacent to the occupant M, fins may be formed due to the bending of the panel at an acute angle.

According to the embodiment, in connection with this problem, the second tongue structure 42 emerged after the breaking of the flat structure 36 of the airbag cover 18 is configured to intervene in between the end of the panel opening 14 opposite to the occupant M and the airbag 16 during the airbag developing. Thereby, the contact between the airbag 16 and the end of the panel opening 14 opposite to the occupant M can be avoided during the airbag developing, so that developing properties of the airbag 16 can be further preferably maintained while the durability the airbag 16 can be further improved by further suppressing the airbag damage.

In particular, according to the embodiment, both sides of the airbag 16 folded and accommodated within the retainer 22 in the vehicle width direction are covered with the side-cover parts 46 of the first tongue structure 38, respectively. Thereby, both sides of the accommodated airbag 16 in the vehicle front-back direction can be covered with the flat structure 36 while both sides of the airbag 16 in the vehicle width direction can be covered with the side-cover parts 46, respectively, so that the perimeter of the folded airbag 16 can be covered with the airbag cover 18. As a result, the function maintaining the folded shape when the airbag 16 is accommodated in the retainer 22 can be further improved, thereby suppressing the generation of shape collapsing of the airbag 16 during the accommodating.

In particular, according to the embodiment, the through-holes 50, 52 formed at both ends of the flat structure 36 in the longitudinal direction and the through-hole formed at the base end of the first tongue structure 38 are passed thorough by the bolts 31, 33, respectively, for fixing the retainer 22 to the vehicle. Thereby, the airbag cover 18 composed of the flat structure 36 and the first tongue structure 38 can be fixed in the retainer 22. By diverting the bolts 31, 33 for fixing the retainer 22 to fixing the airbag cover 18 in such a manner, an additional fixing member is not required for fixing the airbag cover 18, thereby simplifying the structure.

In particular, according to the embodiment, before the operation of the inflator 20 (before the breakage of the flat structure 36), the flat structure 36 and the first tongue structure 38 are connected together by sewing, and after the operation of the inflator 20, the connection part 44 emerged and separated from the flat structure 36 and the first tongue structure 38 are connected together by sewing. Thereby, throughout the operation of the inflator 20, the first tongue structure 38 can be stably fixed.

The embodiment described above is an example of a preferred mode of the present invention; however, the invention is not limited to this, so that various modifications can be made within a scope of the present invention.

For example, according to the embodiment, the present invention is incorporated in a passenger airbag apparatus; the invention is not limited to this, so that the present invention can also be incorporated in a knee airbag apparatus for protecting an occupant knee and a side airbag apparatus provided at a door or a pillar for inflating and developing between an occupant and a vehicle side wall.

The disclosures of Japanese Patent Applications No. 2007-304296 filed on Nov. 26, 2007 and No. 2008-243696 filed on Sep. 24, 2008 are incorporated in the application.

While the invention has been explained with reference to the specific embodiments of the invention, the explanation is illustrative and the invention is limited only by the appended claims.

What is claimed is:

1. An airbag cover for maintaining a folded shape of an airbag when the airbag is folded and accommodated within a casing, the airbag being designed to bulge from an opening formed on a panel constituting a vehicle inner wall for deploying between the panel and an occupant, the airbag cover comprising:
    a first tongue structure partly covering the airbag and having a free end,
    a flat structure for covering at least a side of the airbag facing the opening before a deployment thereof, the flat structure comprising a connection part connected to the first tongue structure and a second tongue structure disposed to partly cover the first tongue structure and to enclose the free end of the first tongue structure; and
    a tear line located between the connection part and the second tongue structure and facing the opening so as to allow the airbag to bulge from the opening when deployed by cleaving the tear line, said tear line being located on a side closer to the occupant relative to a center of the airbag cover in a direction of a vehicle and to allow the free end of the first tongue structure to pass through the opening when the second tongue structure is broken.

2. An airbag cover according to claim 1, wherein the first tongue structure is provided inside the second tongue structure so as to emerge when the flat structure is broken at the tear line and to intervene in between a periphery of the opening of the panel adjacent to the occupant and the airbag during the deployment of the airbag.

3. An airbag cover according to claim 2, wherein the second tongue structure is adapted to emerge on a side of the opening opposite to the occupant so as to intervene in between a periphery of the opening of the panel opposite to the occupant and the airbag during the deployment of the airbag.

4. An airbag cover according to claim 3, wherein the first tongue structure includes a pair of side-cover portions for covering both sides of the airbag in the vehicle width direction before the deployment of the airbag.

5. An airbag cover according to claim 4, wherein the flat structure includes through-holes formed at both ends in a longitudinal direction to be passed through by fixing members for fixing the casing to the vehicle, and
    wherein the first tongue structure includes the through-hole formed at a base end to be passed through by the fixing member.

6. An airbag cover according to claim 5, wherein the connection part is sewn to the first tongue structure.

7. An airbag cover according to claim 4, wherein the side-cover portions protrude from the casing toward the opening on the panel.

8. An airbag apparatus, comprising:
    an airbag to be deployed by gas supplied therein and bulged from an opening formed on a panel constituting a vehicle inner wall for deploying between the panel and an occupant;
    the airbag cover according to claim 1 for maintaining a folded shape of the airbag when the airbag is folded and accommodated within a casing arranged inside the panel;
    an inflator for supplying gas to the airbag; and the casing for accommodating the airbag, the airbag cover, and the inflator.

9. An airbag cover according to claim 1, wherein the first tongue structure has a leading edge distal from the free edge and the connection part is connected to the leading edge of the first tongue structure.

10. An airbag cover according to claim 9, wherein the first tongue structure includes a pair of side-cover parts located at the leading edge of the first tongue structure and extending laterally away from the first tongue structure in line with the leading edge of the first tongue structure.

11. An airbag cover according to claim 9, wherein a leading edge of the second tongue structure and an edge of the connection part are adapted to be connected to the casing by fastening elements through which the casing is connected to a vehicle in which the casing is disposed.

12. An airbag cover according to claim 10, wherein the side cover parts are unitary with the first tongue structure and have portions which extend in a direction normal to the leading edge of the first tongue structure and which are adapted to be fastened to the casing.

* * * * *